United States Patent
Ou et al.

(10) Patent No.: US 11,537,591 B2
(45) Date of Patent: Dec. 27, 2022

(54) COMPUTING SYSTEM WITH REVISED NOTIFICATION MESSAGES AND RELATED METHODS

(71) Applicant: CITRIX SYSTEMS, INC., Fort Lauderdale, FL (US)

(72) Inventors: Yuran Ou, Jiangsu (CN); Yang Wang, Jiangsu (CN)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 142 days.

(21) Appl. No.: 16/162,654

(22) Filed: Oct. 17, 2018

(65) Prior Publication Data
US 2020/0125655 A1 Apr. 23, 2020

(51) Int. Cl.
*G06F 16/23* (2019.01)
*H04L 67/01* (2022.01)

(52) U.S. Cl.
CPC .......... *G06F 16/2358* (2019.01); *H04L 67/01* (2022.05)

(58) Field of Classification Search
CPC ...... G06F 16/2358; H04L 67/42; H04L 67/01
See application file for complete search history.

(56) References Cited

U.S. PATENT DOCUMENTS

| | | | |
|---|---|---|---|
| 9,003,185 B2* | 4/2015 | Chang | H04L 63/083 |
| | | | 713/166 |
| 9,176,744 B2 | 11/2015 | Lee | |
| 9,538,345 B2 | 1/2017 | Sah et al. | |
| 2002/0091975 A1* | 7/2002 | Redlich | H04L 63/0428 |
| | | | 714/699 |
| 2008/0181396 A1* | 7/2008 | Balakrishnan | G06F 40/157 |
| | | | 380/28 |
| 2012/0226519 A1* | 9/2012 | Copeland | G06Q 10/0635 |
| | | | 705/7.28 |
| 2015/0309811 A1* | 10/2015 | Wisgo | G06F 21/54 |
| | | | 719/331 |
| 2015/0381547 A1* | 12/2015 | Mandanapu | G06Q 30/016 |
| | | | 709/206 |
| 2018/0048762 A1* | 2/2018 | Kats | H04M 3/42042 |

FOREIGN PATENT DOCUMENTS

CN 105847560 A * 8/2016 ............ H04M 1/725

OTHER PUBLICATIONS

MDX Toolkit Documentation, Mar. 17, 2014, pp. 1-48. Cited in U.S. Pat. No. 9,619,216 in Patent and IDS. (Year: 2014).*

* cited by examiner

*Primary Examiner* — Hosain T Alam
*Assistant Examiner* — Anthony G Gemignani
(74) *Attorney, Agent, or Firm* — Allen, Dyer, Doppelt + Gilchrist, PA

(57) ABSTRACT

A computing system may include a server, and a client computing device in communication with the server and operating a local mobile OS. One of the client computing device and the server may be configured to compare a notification message with a database of flagged terms to determine whether the notification message includes a flagged term. If the notification message includes the flagged term and the local mobile OS is in a locked state, the notification message is revised by replacing the flagged term with a placeholder term, and the revised notification message is displayed on a display.

12 Claims, 7 Drawing Sheets

COMPUTING SYSTEM WITH REVISED NOTIFICATION MESSAGES AND RELATED METHODS

BACKGROUND

Many enterprises (e.g., corporations, partnerships, academic institutions, etc.) maintain enterprise computer networks that allow enterprise users to access enterprise resources, such as hardware and software applications for email, customer relationship management (CRM), document management, enterprise resource planning (ERP), and the like. Also, many enterprises allow users to access the enterprise network via client computing devices, such as smartphones, tablet computers, and the like. In some cases, software applications running on the client computing devices exchange data with the enterprise network, some of which can become saved on the memory hardware (e.g., hard drives, SD cards) of the client computing devices.

A growing trend among businesses is to allow employees to use their personally owned client computing devices both to access company resources and the use and access their personal applications and data. This trend, known as bring your own device (BYOD) or bring your own technology (BYOT), significantly complicates the task of protecting enterprise resources, including confidential and/or sensitive information.

Moreover, the typical client computing device includes some form of a locked state, which can be implemented by the user or remotely by the administrator. Positively placing the client computing device in the locked state typically impairs access to sensitive information. Nevertheless, in recent years, some mobile operating system (OS) providers have provided the option for displaying sensitive information from applications even when the client computing device is in the locked state. In particular, the client computing device may display notifications while in the locked state. Although this feature may conveniently provide some information to the authorized user without necessitating an unlocking step, this same information is also provided to the unauthorized user, and can be problematic for remote administration of sensitive material.

SUMMARY

Generally, a computing system may include at least one server, and a client computing device in communication with the at least one server and operating a local mobile OS. The client computing device may include a display. At least one of the client computing device and the at least one server may be configured to compare at least one notification message with a database of flagged terms to determine whether the at least one notification message includes at least one flagged term. If the at least one notification message includes the at least one flagged term and the local mobile OS is in a locked state, at least one of the client computing device and the at least one server then revises the at least one notification message by replacing the at least one flagged term with at least one placeholder term, and causes displaying of the revised at least one notification message on the display.

Also, the revised at least one notification message may include a portion of at least one notification message and the dummy text. More specifically, the client computing device may be configured to display, on the display, the at least one notification message with the at least one flagged term when the local mobile OS is in an unlocked state. Advantageously, the client computing device may provide easy and secure access to the notification message without exposing sensitive data.

In some embodiments, the client computing device may be configured to execute a source application for generating the at least one notification message, and for determining whether the at least one notification message includes the at least one flagged term. The source application may be for revising the at least one notification message, and forwarding the revised at least one notification message to the local mobile OS.

In other embodiments, the client computing device may be configured to execute a source application for generating the at least one notification message, and forwarding the at least one notification message to the local mobile OS. The local mobile OS may determine whether the at least one notification message includes the at least one flagged term, and revise the at least one notification message.

In yet other embodiments, the client computing device may be configured to execute a wrapped source application for generating the at least one notification message, and execute a mobile device experience (MDX) toolkit software application for wrapping the source application. The MDX toolkit software application may be configured to intercept the at least one notification message from the source application, determine whether the at least one notification message includes the at least one flagged term, revise the at least one notification message, and forward the revised at least one notification message to the local mobile OS.

Moreover, in some embodiments, the at least one server includes an application server, and a push notification server in communication with the application server. The application server may be configured to generate the at least one notification message, determine whether the at least one notification message includes the at least one flagged term, revise the at least one notification message, and forward the revised at least one notification message to the push notification server.

The at least one server may include a virtual desktop application (VDA) server, and a push notification server in communication with the VDA server. The VDA server may be configured to receive at least one notification message, determine whether the at least one notification message includes the at least one flagged term, revise the at least one notification message, and forward the revised at least one notification message to the push notification server. The database of flagged terms may include name values, address values, and date and time values, for example. Also, the at least one placeholder term may include dummy text.

Another aspect is directed to a method including operating at least one server in communication with a client computing device. The client computing device operates a local mobile OS. The method may include operating at least one of the client computing device and the at least one server to compare at least one notification message with a database of flagged terms to determine whether the at least one notification message includes at least one flagged term. If the at least one notification message includes the at least one flagged term and the local mobile OS is in a locked state, then the at least one notification message is revised by replacing the at least one flagged term with at least one placeholder term, and the revised at least one notification message is displayed on the display.

Yet another aspect is directed to a non-transitory computer-readable medium for at least one of a server and a client computing device. The server is in communication with the client computing device, and the client computing device operates a local mobile OS. The non-transitory computer-readable medium has computer-executable instructions for causing the server and the client computing device to perform the above steps.

DETAILED DESCRIPTION

Figure 1:
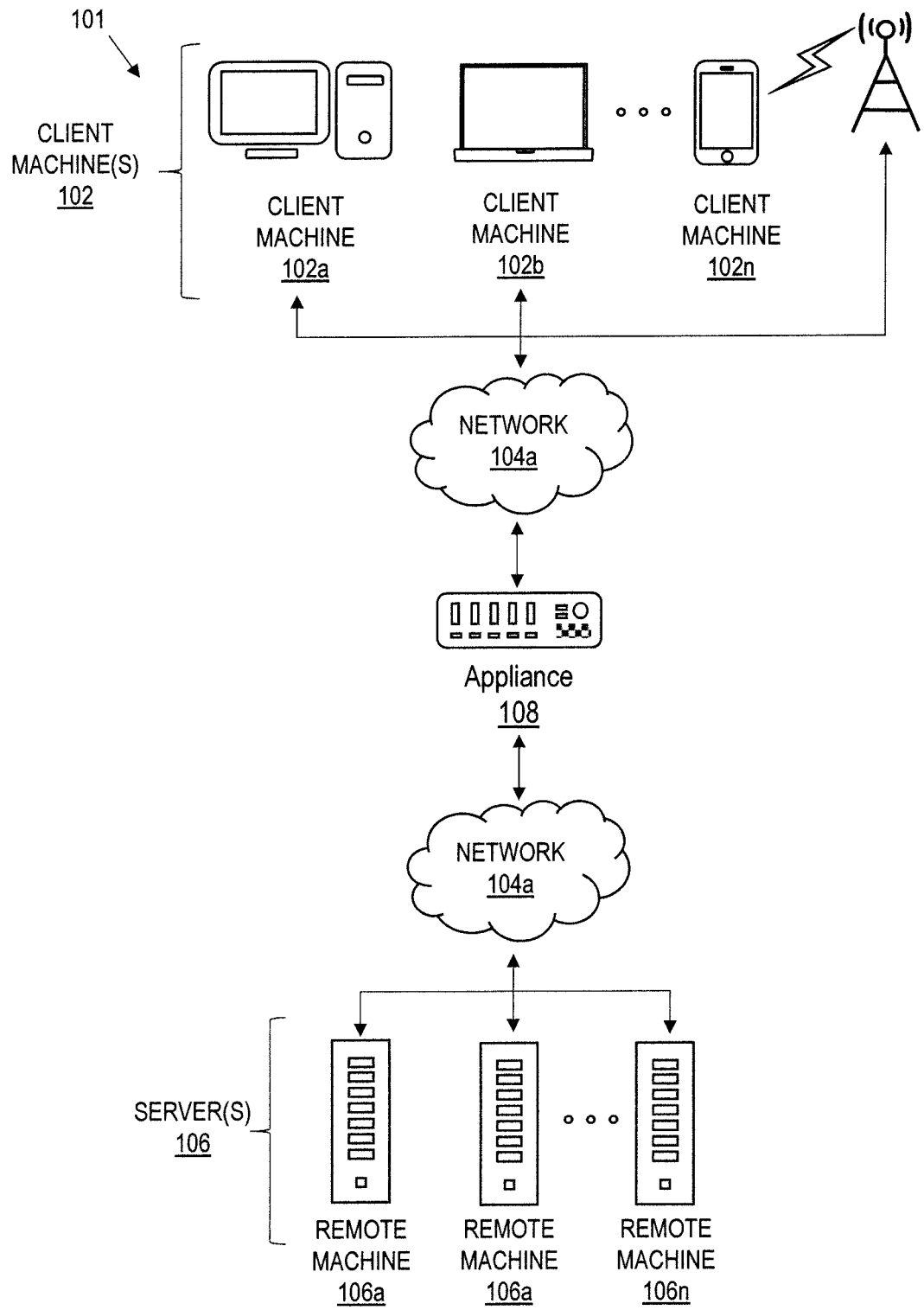
FIG. 1 is a schematic block diagram of a network environment of computing devices in which various aspects of the disclosure may be implemented.

The present description is made with reference to the accompanying drawings, in which example embodiments are shown. However, many different embodiments may be used, and thus the description should not be construed as limited to the particular embodiments set forth herein. Like numbers refer to like elements throughout, and base 100 reference numerals are used to indicate similar elements in alternative embodiments.

As will be appreciated by one of skill in the art upon reading the following disclosure, various aspects described herein may be embodied as a device, a method or a computer program product (e.g., a non-transitory computer-readable medium having computer executable instruction for performing the noted operations or steps). Accordingly, those aspects may take the form of an entirely hardware embodiment, an entirely software embodiment, or an embodiment combining software and hardware aspects.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof.

Referring initially to FIG. 1, a non-limiting network environment 101 (i.e. a communication system) in which various aspects of the disclosure may be implemented includes one or more client machines 102a-102n, one or more remote machines 106a-106n, one or more networks 104a, 104b, and one or more appliances 108 installed within the computing environment 101. The client machines 102a-102n communicate with the remote machines 106a-106n via the networks 104a, 104b.

In some embodiments, the client machines 102a-102n communicate with the remote machines 106a-106n via an intermediary appliance 108. The illustrated appliance 108 is positioned between the networks 104a, 104b and may also be referred to as a network interface or gateway. In some embodiments, the appliance 108 may operate as an application delivery controller (ADC) to provide clients with access to business applications and other data deployed in a datacenter, the cloud, or delivered as Software as a Service (SaaS) across a range of client devices, and/or provide other functionality such as load balancing, etc. In some embodiments, multiple appliances 108 may be used, and the appliance(s) 108 may be deployed as part of the network 104a and/or 104b.

The client machines 102a-102n may be generally referred to as client machines 102, local machines 102, clients 102, client nodes 102, client computers 102, client devices 102, computing devices 102, endpoints 102, or endpoint nodes 102. The remote machines 106a-106n may be generally referred to as servers 106 or a server farm 106. In some embodiments, a client device 102 may have the capacity to function as both a client node seeking access to resources provided by a server 106 and as a server 106 providing access to hosted resources for other client devices 102a-102n. The networks 104a, 104' may be generally referred to as a network 104a. The networks 104a may be configured in any combination of wired and wireless networks.

A server 106 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

A server 106 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 106 may execute a remote presentation services program or other program that uses a thin-client or a remote-display protocol to capture display output generated by an application executing on a server 106 and transmit the application display output to a client device 102. In yet other embodiments, a server 106 may execute a virtual machine providing, to a user of a client device 102, access to a computing environment. The client device 102 may be a virtual machine. The virtual machine may be managed by, for example, a hypervisor, a virtual machine manager (VMM), or any other hardware virtualization technique within the server 106.

In some embodiments, the network 104a may be: a local-area network (LAN); a metropolitan area network (MAN); a wide area network (WAN); a primary public network 104a; and a primary private network 104a. Additional embodiments may include a network 104a of mobile telephone networks that use various protocols to communicate among mobile devices. For short range communications within a wireless local-area network (WLAN), the protocols may include IEEE 802.11, Bluetooth, and Near Field Communication (NFC).

Figure 2:
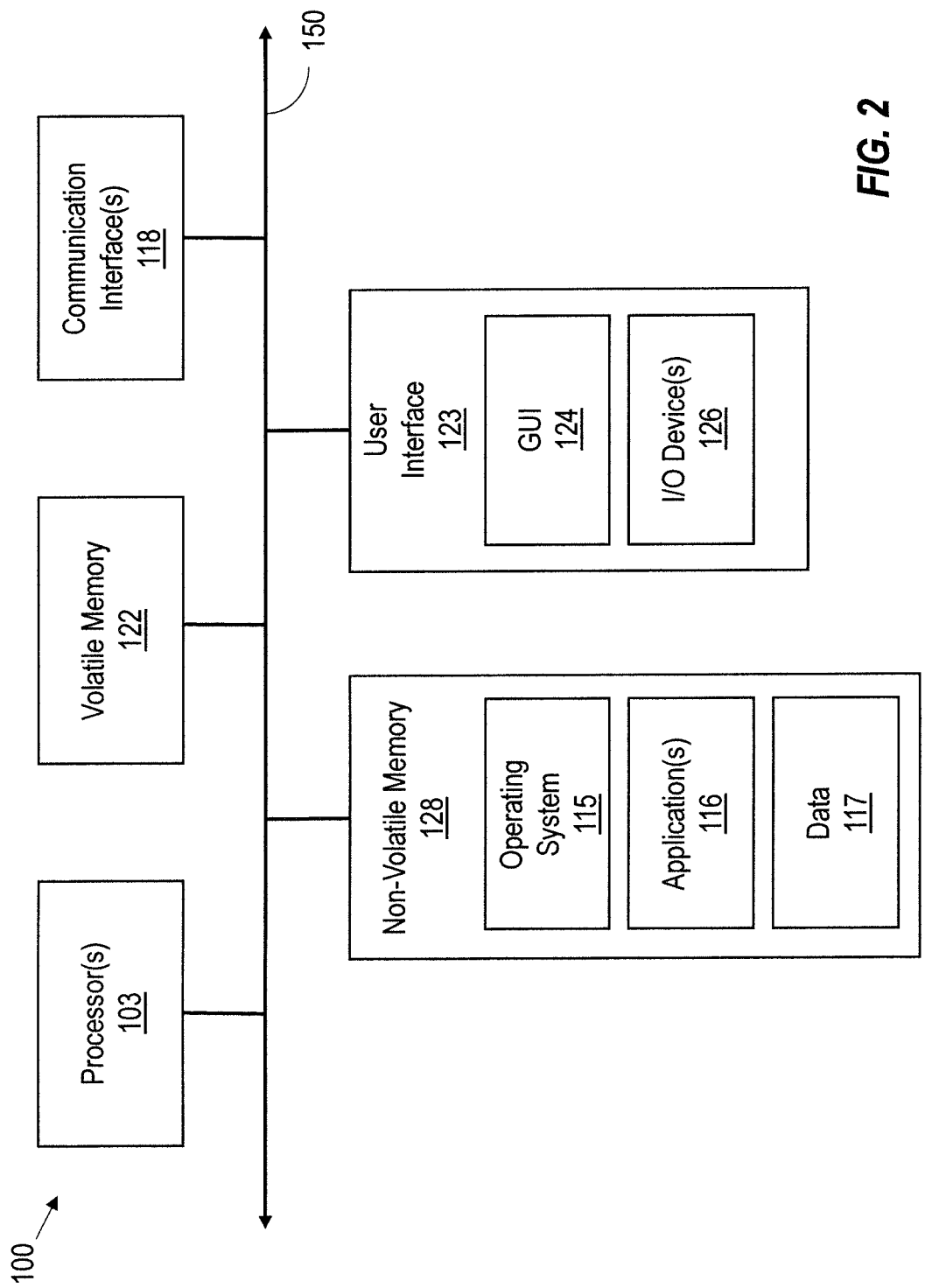
FIG. 2 is a schematic block diagram of a computing device useful for practicing an embodiment of the client machines or the remote machines illustrated in FIG. 1.

FIG. 2 depicts a block diagram of a computing device 100 useful for practicing an embodiment of client devices 102, appliances 108 and/or servers 106. The computing device 100 includes one or more processors 103, volatile memory 122 (e.g., random access memory (RAM)), non-volatile memory 128, user interface (UI) 123, one or more communications interfaces 118, and a communications bus 150. The non-volatile memory 128 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

The user interface 123 may include a graphical user interface (GUI) 124 (e.g., a touchscreen, a display, etc.) and one or more input/output (I/O) devices 126 (e.g., a mouse, a keyboard, a microphone, one or more speakers, one or more cameras, one or more biometric scanners, one or more environmental sensors, and one or more accelerometers, etc.).

The non-volatile memory 128 stores an operating system 115, one or more applications 116, and data 117 such that, for example, computer instructions of the operating system 115 and/or the applications 116 are executed by processor(s) 103 out of the volatile memory 122. In some embodiments, the volatile memory 122 may include one or more types of RAM and/or a cache memory that may offer a faster response time than a main memory. Data may be entered using an input device of the GUI 124 or received from the I/O device(s) 126. Various elements of the computer 100 may communicate via the communications bus 150.

The illustrated computing device 100 is shown merely as an example client device or server, and may be implemented by any computing or processing environment with any type of machine or set of machines that may have suitable hardware and/or software capable of operating as described herein.

The processor(s) 103 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

The processor 103 may be analog, digital or mixed-signal. In some embodiments, the processor 103 may be one or more physical processors, or one or more virtual (e.g., remotely located or cloud) processors. A processor including multiple processor cores and/or multiple processors may provide functionality for parallel, simultaneous execution of instructions or for parallel, simultaneous execution of one instruction on more than one piece of data.

The communications interfaces 118 may include one or more interfaces to enable the computing device 100 to access a computer network such as a Local Area Network (LAN), a Wide Area Network (WAN), a Personal Area Network (PAN), or the Internet through a variety of wired and/or wireless connections, including cellular connections.

In described embodiments, the computing device 100 may execute an application on behalf of a user of a client device. For example, the computing device 100 may execute one or more virtual machines managed by a hypervisor. Each virtual machine may provide an execution session within which applications execute on behalf of a user or a client device, such as a hosted desktop session. The computing device 100 may also execute a terminal services session to provide a hosted desktop environment. The computing device 100 may provide access to a remote computing environment including one or more applications, one or more desktop applications, and one or more desktop sessions in which one or more applications may execute.

Additional descriptions of a computing device 100 configured as a client device 102 or as a server 106, or as an appliance intermediary to a client device 102 and a server 106, and operations thereof, may be found in U.S. Pat. Nos. 9,176,744 and 9,538,345, which are incorporated herein by reference in their entirety. The '744 and '345 patents are both assigned to the current assignee of the present disclosure.

Figure 3A:
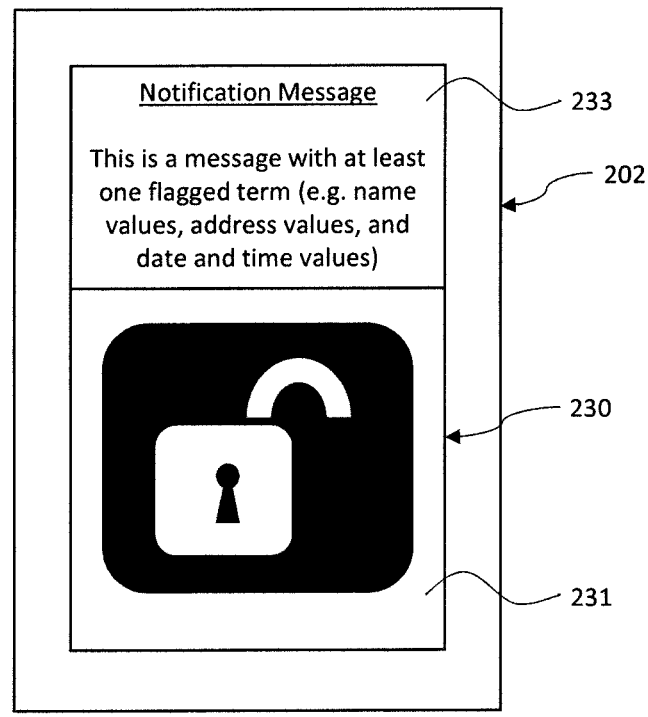
FIGS. 3A and 3B are schematic diagrams of a client computing device when the mobile OS is respectively in an unlocked state and a locked state, according to an example embodiment.
Figure 3B:
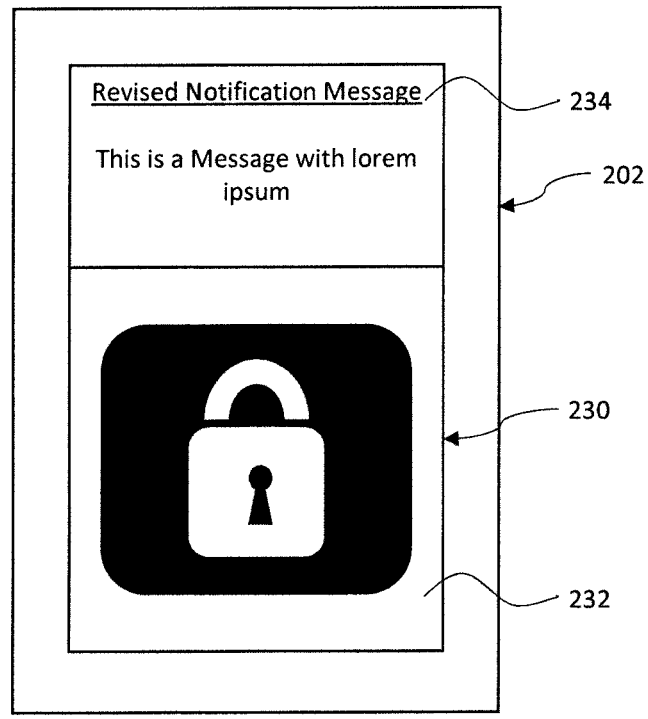
Figure 4:
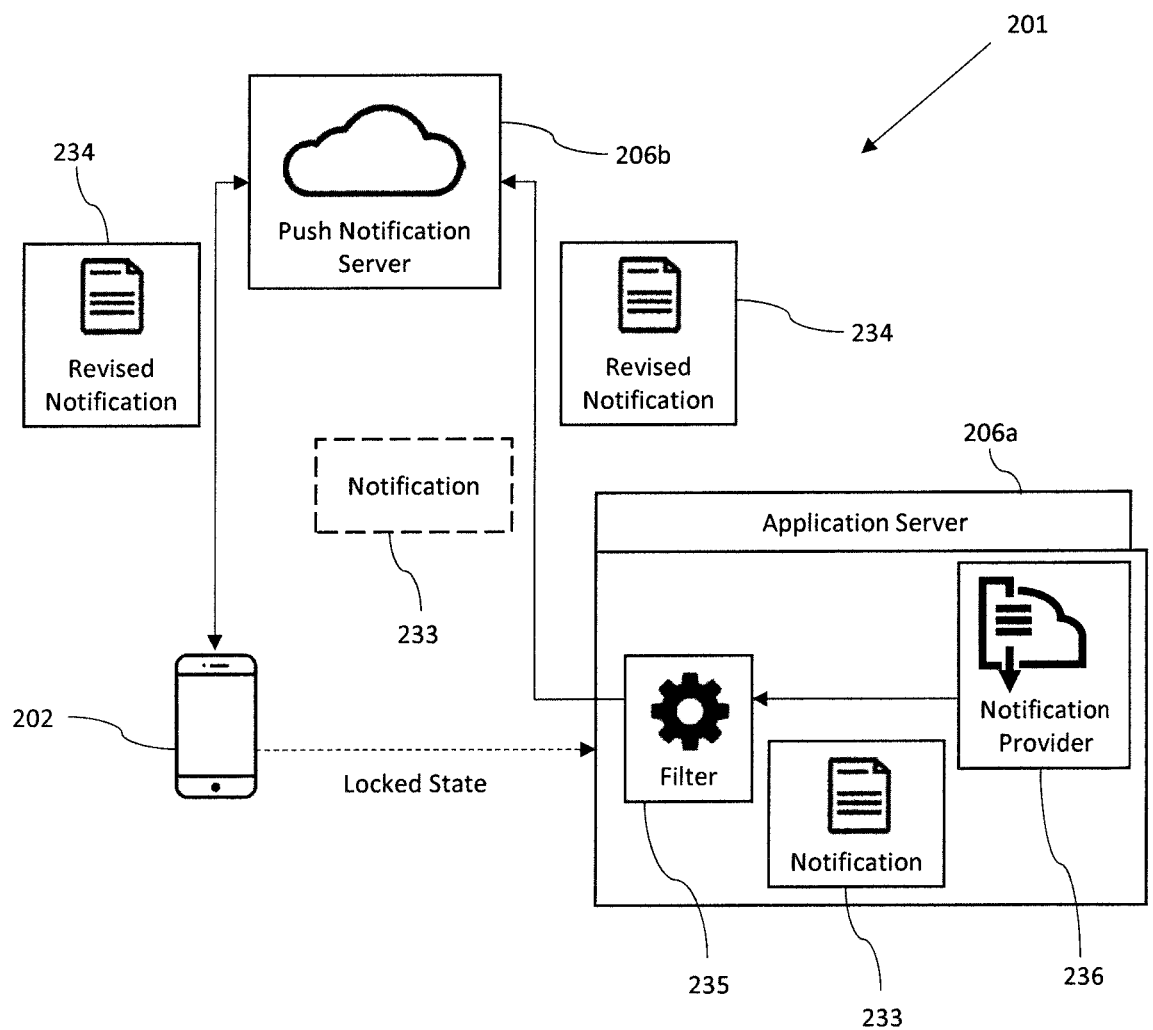
FIG. 4 is a schematic block diagram of a computing system, according to a first example embodiment.

Referring now to FIGS. 3A-3B and 4, a computing system 201 illustratively includes a plurality of servers 206a-206b, and a client computing device 202 in communication with the plurality of servers and operating a local mobile OS (e.g. iOS, Android, Windows Mobile, Tizen). Of course, the plurality of servers 206a-206b is merely exemplary in nature, and other embodiments may consolidate the same functions within a single sever.

As will be appreciated in detail below, the computing system 201 advantageously provides the user of the client computing device 202 with access to a revised notification message 234 even when the local mobile OS is in the locked state, thereby permitting convenient access without required the extra step of unlocking the phone. Further, this ease of access does not come with the cost of disclosure of sensitive information since the at least one flagged term is replaced with non-sensitive data.

The client computing device 202 includes a processor, a memory cooperating with the processor, and a display 230 (e.g. a touchscreen display) cooperating with the processor. In this embodiment, the plurality of servers 206a-206b comprises an application server (or web server executing a progressive web application (PWA)) 206a configured to generate a notification message 233, and a push notification server 206b configured to push/forward the notification message to the client computing device 202. For illustrative clarity, only one notification message 233 is shown, but in typical use, a large number of notification messages 233 could be processed as disclosed herein.

The application server 206a is configured to compare the notification message 233 with a database of flagged terms to determine whether the notification message includes at least one flagged term. For example, the database of flagged terms may include name values, address values, and date and time values. Indeed, the database of flagged terms includes any sensitive data as defined by one or more of a given user of the client computing device 202, an administrator of the application server 206a, or a platform security policy. In this embodiment, the database of flagged terms is stored in the application server 206a.

The application server 206a is configured to if the notification message 233 includes the at least one flagged term and the local mobile OS is in a locked state (FIG. 3B), then perform at least the following steps. The steps illustratively include revising the notification message 233 by replacing the at least one flagged term with at least one placeholder term (e.g. the illustrated dummy text in FIG. 3B), i.e. filtering the notification message, and causing the display of the revised notification message 234 on the display 230.

When the local mobile OS of the client computing device 202 is in a locked state, the client computing device can only display the revised notification message 234 in the locked state interface 232. Of course, the client computing device 202 is configured to display, on the display 230, the notification message 233, along with the unlocked state interface 231, with the at least one flagged term when the local mobile OS is in an unlocked state (FIG. 3A). In other words, when in the mobile OS is in the unlocked state, there is no need to filter or revise the at least one flagged term.

In the illustrated embodiment, the push notification server 206b is in communication (e.g. over the Internet or closed network) with the application server 206a. The application server 206a illustratively includes a notification provider module configured to generate the notification message 233, and a filter module 235 configured to receive the notification message. The filter module 235 is configured to determine whether the notification message 233 includes the at least one flagged term, revise the notification message, and forward (e.g. using the Apple Push Notification Service or the Google Cloud Messaging Service) the revised notification message 234 to the push notification server 206b. The push notification server 206b is configured to push/forward the revised notification message 234 to the client computing device 202.

In the illustrated embodiment, the push notification server 206b is optionally configured to push/forward both the notification message 233 and the revised notification message 234 to the client computing device 202 (shown with dashed lines). The client computing device 202 is configured to selectively display the notification message 233 only when the local mobile OS is in the unlocked state, and display the revised notification message 234 when the local mobile OS is in the locked state.

In the illustrated embodiment, the push notification server 206b is optionally configured to monitor the state of the local mobile OS (shown with dashed lines), and push/forward both the revised notification message 234 to the client computing device 202 when the local mobile OS is in the locked state. The push notification server 206b is configured to subsequently push/forward the notification message 233 to the client computing device 202 when the local mobile OS is in the unlocked state.

Figure 6:
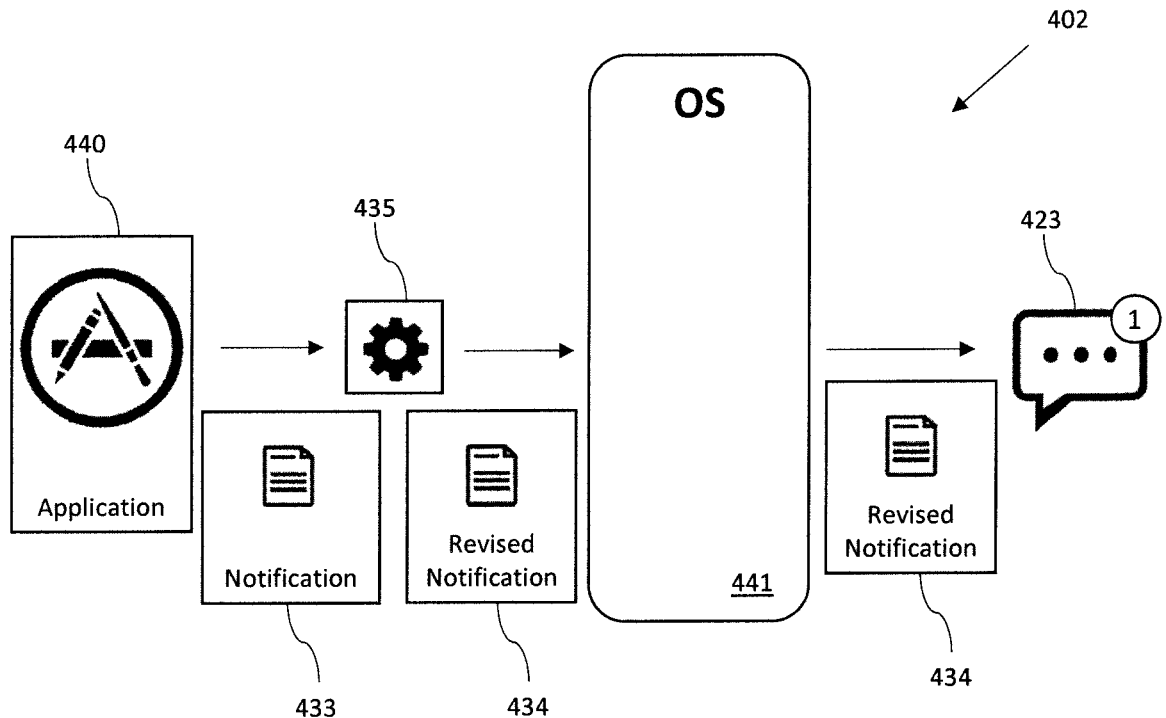
FIG. 6 is a schematic block diagram of a client computing device, according to a first example embodiment.
Figure 7:
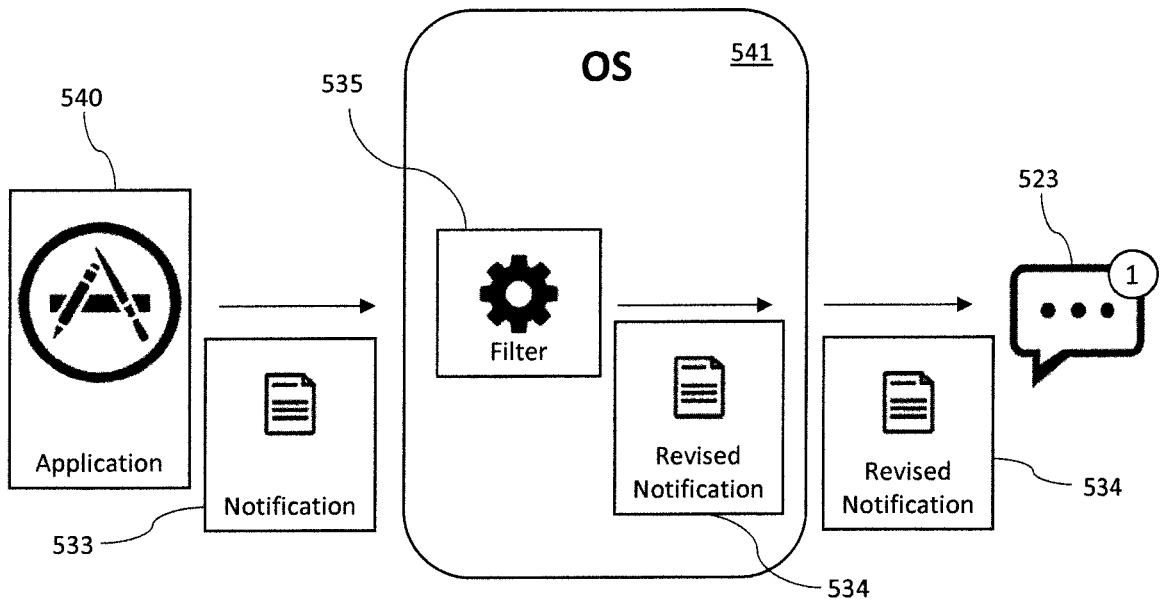
FIG. 7 is a schematic block diagram of a client computing device, according to a second example embodiment.
Figure 8:
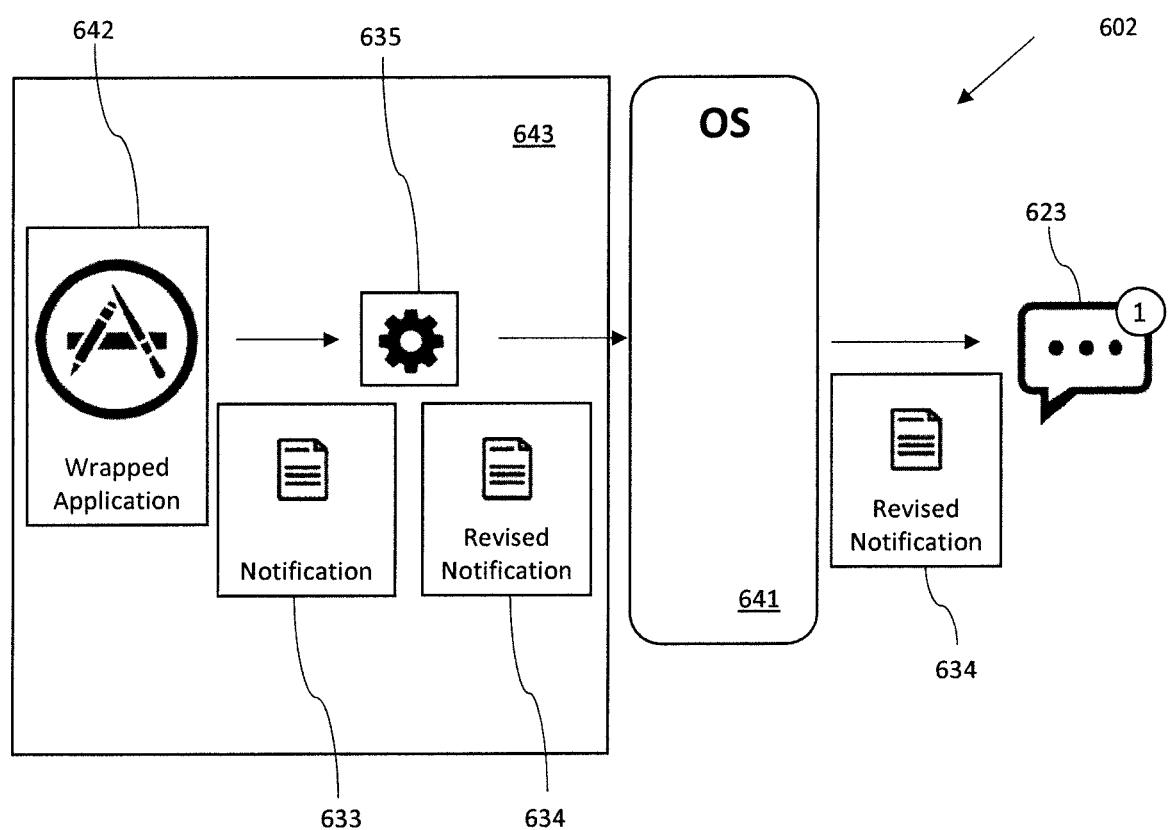
FIG. 8 is a schematic block diagram of a client computing device, according to a third example embodiment.

Of course, in other embodiments, the filter module 235 is within the push notification server 206b. In yet other embodiments, the filter module 235 may not be provided server side and may be provided locally in the client computing device 202 (FIGS. 6-8).

Another aspect is directed to a method including operating at least one server 206a-206b in communication with a client computing device 202. The client computing device 202 operates a local mobile OS. The method includes at least one of the client computing device 202 and the at least one server 206a-206b to compare at least one notification message 233 with a database of flagged terms to determine whether the at least one notification message includes at least one flagged term. If the at least one notification message includes the at least one flagged term and the local mobile OS is in a locked state, then the at least one notification message is revised by replacing the at least one flagged term with at least one placeholder term, and the at least one of the client computing device 202 and the at least one server 206a-206b causes display of the revised at least one notification message 234 on the display 230.

Yet another aspect is directed to a non-transitory computer-readable medium for at least one of at least one server 206a-206b and a client computing device 202. The at least one server 206a-206b is in communication with the client computing device 202, and the client computing device operates a local mobile OS. The non-transitory computer-readable medium has computer-executable instructions for causing the at least one of the at least one server 206a-206b and the client computing device 202 to perform steps. The steps include comparing at least one notification message 233 with a database of flagged terms to determine whether the at least one notification message includes at least one flagged term, and if the at least one notification message includes the at least one flagged term and the local mobile OS is in a locked state, then performing revising the at least one notification message by replacing the at least one flagged term with at least one placeholder term, and causing display of the revised at least one notification message 234 on the display 230.

Figure 5:
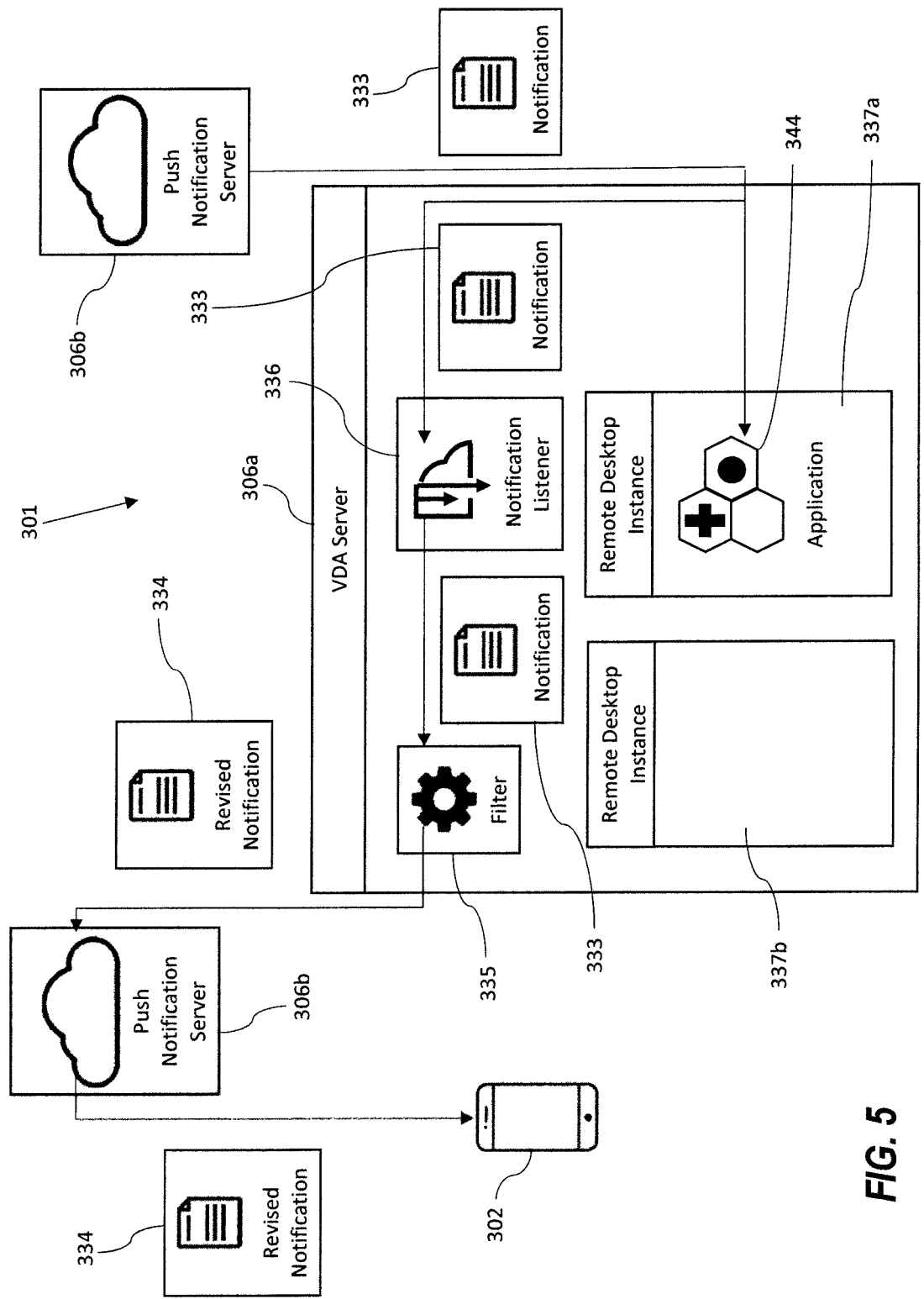
FIG. 5 is a schematic block diagram of a computing system, according to a second example embodiment.

Referring now additionally to FIG. 5, another embodiment of the computing system 301 is now described. In this embodiment of the computing system 301, those elements already discussed above with respect to FIGS. 3A-3B & 4 are incremented by 300 and most require no further discussion herein. This embodiment differs from the previous embodiment in that this computing system 301 illustratively includes a VDA server 306a, and a push notification server 306b in communication with the VDA server. The VDA server 306a is configured to generate a plurality of remote desktop instances 337a-337b for a corresponding plurality of users. In the illustrated embodiment, for drawing clarity, only two remote desktop instances 337a-337b are shown, but the skilled person should readily appreciate that a large number of desktop instances could be provided. The VDA server 306a illustratively includes a notification listener module 336, and a filter module 335 in communication with the notification listener module.

In this embodiment, the first desktop instances 337a is configured to execute an application 344, and an application server (not shown) associated with the application 344 is configured to generate a notification message 333 and transmit the notification message to the notification listener module 336. Within the VDA server 306a, the notification message 333 is forwarded to the notification listener module 333 and the application 344 within the first remote desktop instance 337a.

The filter module 335 is configured determine whether the notification message 333 includes the at least one flagged term, revise the notification message, and forward the revised notification message 334 back to the push notification server 306b. The push notification server 306b is configured to push/forward the revised notification message 334 to the client computing device 302.

Referring now additionally to FIG. 6, another embodiment of the client computing device 402 is now described. In this embodiment of the client computing device 402, those elements already discussed above with respect to FIGS. 3A-3B & 4 are incremented by 400 and most require no further discussion herein. This embodiment differs from the previous embodiment in that this client computing device 402 illustratively performs the filtering of the notification message 433 at the client computing device 402.

In the illustrated embodiment, the client computing device 402 is configured to execute a source application 440 configured to generate the notification message 433. For example, the source application 440 may comprise a native local mobile OS application, or a web browser based application. Also, the client computing device 402 is configured to execute a filter module 435 configured to determine whether the notification message 433 includes the at least one flagged term, revise the notification message, and forward the revised notification message 434 to the local mobile OS 441. The filter module 435 may be integrated within the source application 440 or may be part of a separate security application.

As will be appreciated, the filter module 435 is configured to forward the revised notification message 434 to the local mobile OS 441 by using a notification application programming interface (API) of the local mobile OS 441. The local mobile OS 441 is configured to display the revised notification message 434 within a user interface 423. In particular, the revised notification message 434 is displayed within a notification shade of the user interface 423.

Referring now additionally to FIG. 7, another embodiment of the client computing device 502 is now described. In this embodiment of the client computing device 502, those elements already discussed above with respect to FIGS. 3A-3B & 4 are incremented by 500 and most require no further discussion herein. This embodiment differs from the previous embodiment in that this client computing device 502 illustratively performs the filtering of the notification message 533 at the client computing device 502.

In the illustrated embodiment, the client computing device 502 is configured to execute a source application 540 for generating the notification message 533, and forwarding the notification message to the local mobile OS 541. The local mobile OS 541 is configured to determine whether the notification message 533 includes the at least one flagged term, and revise the notification message. In other words, the filter module 535 is baked into the local mobile OS. The local mobile OS 541 is configured to display the revised notification message 534 within a user interface 523.

Referring now additionally to FIG. 8, another embodiment of the client computing device 602 is now described. In this embodiment of the client computing device 602, those elements already discussed above with respect to FIGS. 3A-3B & 4 are incremented by 600 and most require no further discussion herein. This embodiment differs from the previous embodiment in that this client computing device 602 illustratively performs the filtering of the notification message 633 at the client computing device 602.

In the illustrated embodiment, the client computing device 602 is configured to execute a wrapped source application 642 (i.e. a normal enterprise application wrapped with an MDX toolkit) for generating the notification message 633, and execute a MDX application 643, as available from the present disclosure's assignee, which is part of a mobile application manager software application, for wrapping the source application.

The MDX application 643 is configured to intercept the notification message 633 from the wrapped source application 642. In particular, the wrapped source application 642 is configured to generate the notification message 633 and to call a hooked notification API of the local mobile OS 641. The hooked API includes a filter module 635 configured to determine whether the notification message 633 includes the at least one flagged term, revise the notification message, and forward the revised notification message 634 to the local mobile OS 641.

In the embodiments of FIGS. 6-8, the database of flagged terms may be stored locally at the client computing device 402, 502, 602. Alternatively, the database of flagged terms may be stored remotely in server.

Many modifications and other embodiments will come to the mind of one skilled in the art having the benefit of the teachings presented in the foregoing descriptions and the associated drawings. Therefore, it is understood that the foregoing is not to be limited to the example embodiments, and that modifications and other embodiments are intended to be included within the scope of the appended claims.

That which is claimed is:

1. A computing system comprising:
   an application server, and a push notification server in communication with said application server; and
   a client computing device in communication with said application server and said push notification server, operating a local mobile operating system (OS), and comprising a display;
   said application server configured to perform at least the following:
      monitor a lock state of the local mobile OS of said client computing device;
      generate at least one notification message,
      compare the at least one notification message with a database of flagged terms to determine whether the at least one notification message comprises at least one flagged term, said database of flagged terms comprising name values, address values, and date and time values, said database of flagged terms being defined by a respective user of the client computing device and a platform security policy; and
      only when the at least one notification message comprises the at least one flagged term and the local mobile OS is in a locked state, then perform at least the following:
         revise the at least one notification message by replacing the at least one flagged term with at least one placeholder term, the at least one placeholder term comprising dummy text, the revised at least one notification message comprising a portion of at least one notification message and the dummy text;
         forward the revised at least one notification message to said push notification server for displaying of the revised at least one notification message on said display; and
         when the local mobile OS returns to an unlocked state, subsequent to the forwarding of the revised at least one notification message, forward the at least one notification message to said push notification server for displaying on said display, the at least one notification message comprising an original unfiltered notification message; and
      otherwise, when the at least one notification message does not comprise the at least one flagged term or when the local mobile OS is in the unlocked state, forward the at least one notification message to said push notification server for displaying of the at least one notification message on said display, the at least one notification message comprising the original unfiltered notification message.

2. The computing system of claim 1 wherein said application server is configured to store the database of flagged terms.

3. The computing system of claim 1 wherein said application server is configured to otherwise forward the at least one notification message to said push notification server using a notification service of the local mobile OS.

4. The computing system of claim 3 wherein the notification service comprises at least one of an Apple Push Notification Service or a Google Cloud Messaging Service.

5. The computing system of claim 1 wherein the revised at least one notification message comprising a portion of at least one notification message in line with the dummy text.

6. The computing system of claim 1 wherein said application server comprises a notification provider module configured to generate the at least one notification message, and a filter module configured to receive the at least one notification message.

7. A method comprising:
operating an application server, a push notification server in communication with the application server, and a client computing device in communication with the application server and the push notification server, with the client computing device operating a local mobile operating system (OS); and
operating the application server to perform at least the following:
monitor a lock state of the local mobile OS of the client computing device;
generate at least one notification message;
comparing the at least one notification message with a database of flagged terms to determine whether the at least one notification message comprises at least one flagged term, the database of flagged terms comprising name values, address values, and date and time values, the database of flagged terms being defined by a respective user of the client computing device and a platform security policy; and
only when the at least one notification message comprises the at least one flagged term and the local mobile OS is in a locked state, then performing at least the following:
revising the at least one notification message by replacing the at least one flagged term with at least one placeholder term, the at least one placeholder term comprising dummy text, the revised at least one notification message comprising a portion of at least one notification message and the dummy text;
forwarding the revised at least one notification message to the push notification server for displaying of the revised at least one notification message on the display; and
when the local mobile OS returns to an unlocked state, subsequent to the forwarding of the revised at least one notification message, forward the at least one notification message to the push notification server for displaying on the display, the at least one notification message comprising an original unfiltered notification message; and
otherwise, when the at least one notification message does not comprise the at least one flagged term or when the local mobile OS is in the unlocked state, forwarding the at least one notification message to the push notification server for displaying of the at least one notification message on the display, the at least one notification message comprising the original unfiltered notification message.

8. The method of claim 7 further comprising operating the application server to store the database of flagged terms.

9. The method of claim 7 further comprising operating the application server to otherwise forward the at least one notification message to the push notification server using a notification service of the local mobile OS.

10. A non-transitory computer-readable medium for an application server, a push notification server in communication with the application server, and a client computing device in communication with the application server and the push notification server, the client computing device operating a local mobile operating system (OS), the non-transitory computer-readable medium having computer-executable instructions for causing the application server and the push notification server to perform steps comprising:
monitoring, via the application server, a lock state of the local mobile OS of the client computing device;
generating, via the application server, at least one notification message;
comparing, via the application server, the at least one notification message with a database of flagged terms to determine whether the at least one notification message comprises at least one flagged term, the database of flagged terms comprising name values, address values, and date and time values, the database of flagged terms being defined by a respective user of the client computing device and a platform security policy;
only when the at least one notification message comprises the at least one flagged term and the local mobile OS is in a locked state, then, via the application server, performing at least the following:
revising the at least one notification message by replacing the at least one flagged term with at least one placeholder term, the at least one placeholder term comprising dummy text, the revised at least one notification message comprising a portion of at least one notification message and the dummy text;
forwarding the revised at least one notification message to the push notification server for displaying of the revised at least one notification message on the display; and
when the local mobile OS returns to an unlocked state, subsequent to the forwarding of the revised at least one notification message, forwarding the at least one notification message to the push notification server for displaying on the display, the at least one notification message comprising an original unfiltered notification message; and
otherwise, when the at least one notification message does not comprise the at least one flagged term or when the local mobile OS is in the unlocked state, via the application server, forwarding the at least one notification message to the push notification server for displaying of the at least one notification message on the display, the at least one notification message comprising the original unfiltered notification message.

11. The non-transitory computer-readable medium of claim 10 wherein the steps further comprises storing, at the application server, the database of flagged terms.

12. The non-transitory computer-readable medium of claim 10 wherein the steps further comprises forwarding, at the application server, the at least one notification message to the push notification server using a notification service of the local mobile OS.

* * * * *